US012413757B2

United States Patent
Zhao et al.

(10) Patent No.: US 12,413,757 B2
(45) Date of Patent: Sep. 9, 2025

(54) TEMPLATE MATCHING BASED PARTITIONING PATTERN DERIVATION

(71) Applicant: Tencent America LLC, Palo Alto, CA (US)

(72) Inventors: Xin Zhao, San Jose, CA (US); Guichun Li, San Jose, CA (US); Lien-Fei Chen, Hsinchu (TW); Han Gao, San Diego, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 47 days.

(21) Appl. No.: 18/379,624

(22) Filed: Oct. 12, 2023

(65) Prior Publication Data

US 2024/0129508 A1 Apr. 18, 2024

Related U.S. Application Data

(60) Provisional application No. 63/416,407, filed on Oct. 14, 2022.

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/119* (2014.11); *H04N 19/176* (2014.11)

(58) Field of Classification Search
CPC .... H04N 19/44; H04N 19/105; H04N 19/119; H04N 19/176; H04N 19/132; H04N 19/137
(Continued)

(56) References Cited

U.S. PATENT DOCUMENTS

2019/0313104 A1 10/2019 Yu et al.
2021/0092431 A1* 3/2021 Zhang .................. H04N 19/105
(Continued)

OTHER PUBLICATIONS

International Search Report and Written Opinion issued in International Application No. PCT/US2023/076871, mailed Feb. 21, 2024, 6 pages.

*Primary Examiner* — Tung T Vo
(74) *Attorney, Agent, or Firm* — ArentFox Schiff LLP

(57) ABSTRACT

A reference block is determined from a plurality of candidate reference blocks for a current block in a current picture based on template matching (TM) costs of the plurality of candidate reference blocks. The TM costs indicate differences between a template of the current block and respective reference templates of the plurality of candidate reference blocks. Samples of the determined reference block are classified into a plurality of classes of samples. A partitioning pattern of the current block is derived based on the determined reference block from a predetermined plurality of partitioning patterns. The derived partitioning pattern indicates a plurality of partitions of the current block. Each of the plurality of classes of the samples of the determined reference block corresponds to a respective partition of the plurality of partitions of the current block. The current block is reconstructed based on the derived partitioning pattern of the current block.

20 Claims, 9 Drawing Sheets

(51) Int. Cl.
*H04N 19/119* (2014.01)
*H04N 19/176* (2014.01)

(58) Field of Classification Search
USPC .................................................. 375/240.25
See application file for complete search history.

(56) References Cited

U.S. PATENT DOCUMENTS

| | | |
|---|---|---|
| 2021/0235072 A1 | 7/2021 | Ko et al. |
| 2021/0281838 A1* | 9/2021 | Lee ..................... H04N 19/176 |
| 2021/0297673 A1* | 9/2021 | Zhang ................... H04N 19/52 |
| 2021/0409698 A1* | 12/2021 | Sychev ................. H04N 19/70 |

* cited by examiner

TEMPLATE MATCHING BASED PARTITIONING PATTERN DERIVATION

INCORPORATION BY REFERENCE

The present application claims the benefit of priority to U.S. Provisional Application No. 63/416,407, "Template Matching Based Partitioning Pattern Derivation" filed on Oct. 14, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry.

According to an aspect of the disclosure, a method of video decoding is provided. In the method, a video bitstream comprising a current block in a current picture is received. A reference block is determined from a plurality of candidate reference blocks for the current block based on template matching (TM) costs of the plurality of candidate reference blocks. The TM costs indicate differences between a template of the current block and respective reference templates of the plurality of candidate reference blocks. Samples of the determined reference block are classified into a plurality of classes of samples. A partitioning pattern of the current block is derived based on the determined reference block from a predetermined plurality of partitioning patterns. The derived partitioning pattern indicates a plurality of partitions of the current block. Each of the plurality of classes of the samples of the determined reference block corresponds to a respective partition of the plurality of partitions of the current block. The current block is reconstructed based on the derived partitioning pattern of the current block.

In an aspect, the plurality of candidate reference blocks is from one of the current picture and a reference picture of the current block. The samples of the determined reference block are reconstructed samples.

In an example, an initial reference block is determined based on motion vector information included in the received video bitstream. The plurality of candidate reference blocks is determined within a search range of the initial reference block. The TM costs between the reference template of each of the plurality of candidate reference blocks and the template of the current block are determined. The reference block is determined from the plurality of candidate reference blocks that corresponds to a minimum TM cost among the determined TM costs between the reference template of each of the plurality of candidate reference blocks and the template of the current block.

In an example, the samples of the determined reference block are classified into a first class of samples and a second class of samples based on a binary image segmentation algorithm.

In an example, the samples of the determined reference block are classified into a first class of samples with sample values that are larger than a threshold value and a second class of samples with sample values that are less than the threshold value. The threshold value is one of an average value of the samples and a median value of the samples.

In an example, the samples of the determined reference block are clustered into one or more classes of samples in a clustering method.

In an example, a template area adjacent to the determined reference block is determined. The samples of the determined reference block are classified into one or more classes of samples based on sample values of the template area adjacent to the determined reference block in an edge detection. The one or more classes of samples include at least a first class that includes the samples at edges of the determined reference block and a second class that includes the samples at an inner region of the determined reference block.

In an example, the template area includes one of (i) a plurality of rows of neighboring samples at a top side of the determined reference block, (ii) a plurality of columns of neighboring samples at a left side of the determined reference block, or (iii) a region in one or more reconstructed neighboring blocks of the determined reference block.

In an example, the samples of the determined reference block are classified based on each of a plurality of candidate partitioning boundaries. A plurality of candidate partitioning boundaries for the current block is determined, where each of the plurality of candidate partitioning boundaries for the current block corresponds to a respective one of the plurality of candidate partitioning boundaries for the determined reference block. A TM cost between each of the plurality of candidate partitioning boundaries for the samples of the determined reference block and a corresponding one of the plurality of candidate partitioning boundaries for samples of the current block is determined. A partitioning boundary is determined from the plurality of candidate partitioning boundaries for the current block that corresponds to a minimum TM cost among the determined TM costs. The plurality of partitions of the current block is determined based on the determined partitioning boundary.

In an example, a binary mask is determined based on one of an average value and a median value of reconstructed samples of the template of the current block. A dominant sample group in the reconstructed samples of the template of the current block is determined based on the binary mask. A dominant sample group in samples of a reference template of each of the plurality of candidate reference blocks is determined based on the binary mask. A TM cost between the dominant group in the reconstructed samples of the template of the current block and the dominant group in the samples of the reference template of each of the plurality of candidate reference blocks is determined. The reference block is determined from the plurality of candidate reference blocks that corresponds to a minimum TM cost among the determined TM costs between the dominant group in the reconstructed samples of the template of the current block and the dominant group in the samples of the reference template of each of the plurality of candidate reference blocks.

In an example, the plurality of candidate reference blocks is determined based on a plurality of motion vectors associated with the current block.

In an example, a TM cost between a reference template of each of the plurality of candidate reference blocks and the template of the current block is determined. A candidate reference block is determined from the plurality of candidate reference blocks that corresponds to a minimum TM cost among the determined TM costs between the reference template of each of the plurality of candidate reference blocks and the template of the current block. A motion vector (MV) is determined based on the determined candidate reference block. The motion vector indicates an offset between the current block and the determined candidate reference block. An adjusted MV is determined based on the determined MV and a motion vector difference (MVD). The reference block is determined based on the adjusted MV.

In an example, the plurality of candidate reference blocks is determined in the current picture. A TM cost between a reference template of each of the plurality of candidate reference blocks and the template of the current block is determined. A candidate reference block is determined from the plurality of candidate reference blocks that corresponds to a minimum TM cost among the determined TM costs between the reference template of each of the plurality of candidate reference blocks and the template of the current block. A block vector (BV) is determined based on the determined candidate reference block, where the BV indicates an offset between the current block and the determined candidate reference block. The reference block is determined based on the determined BV.

According to another aspect of the disclosure, an apparatus is provided. The apparatus includes processing circuitry. The processing circuitry can be configured to perform any of the described methods for video decoding/encoding. For example, the processing circuitry is configured to receive a video bitstream comprising a current block in a current picture. The processing circuitry is configured to determine a reference block from a plurality of candidate reference blocks for the current block based on template matching (TM) costs of the plurality of candidate reference blocks. The TM costs indicate differences between a template of the current block and respective reference templates of the plurality of candidate reference blocks. The processing circuitry is configured to classify samples of the determined reference block into a plurality of classes of samples. The processing circuitry is configured to derive a partitioning pattern of the current block based on the determined reference block from a predetermined plurality of partitioning patterns. The derived partitioning pattern indicates a plurality of partitions of the current block. Each of the plurality of classes of the samples of the determined reference block corresponds to a respective partition of the plurality of partitions of the current block. The processing circuitry is configured to reconstruct the current block based on the derived partitioning pattern of the current block.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
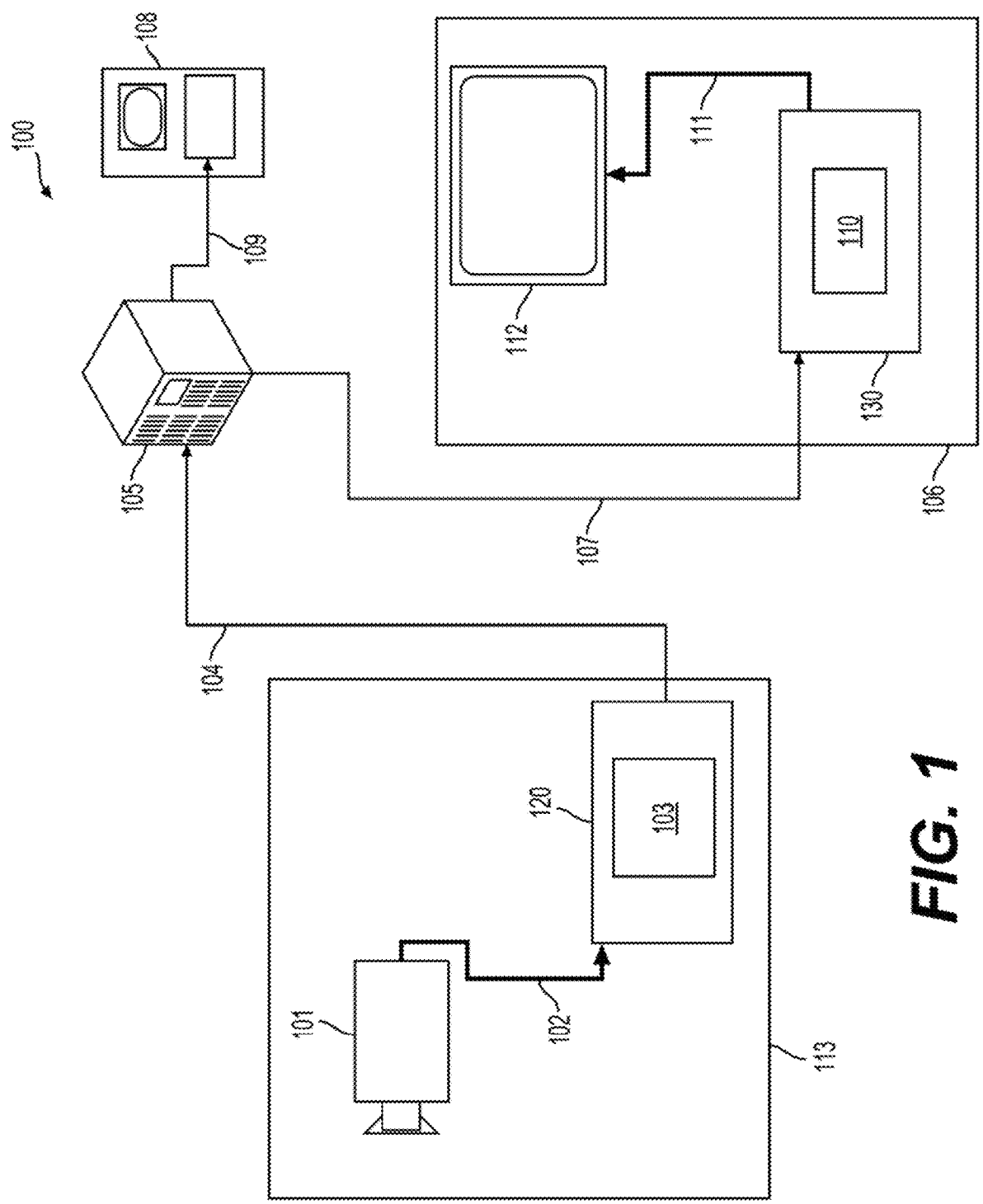
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
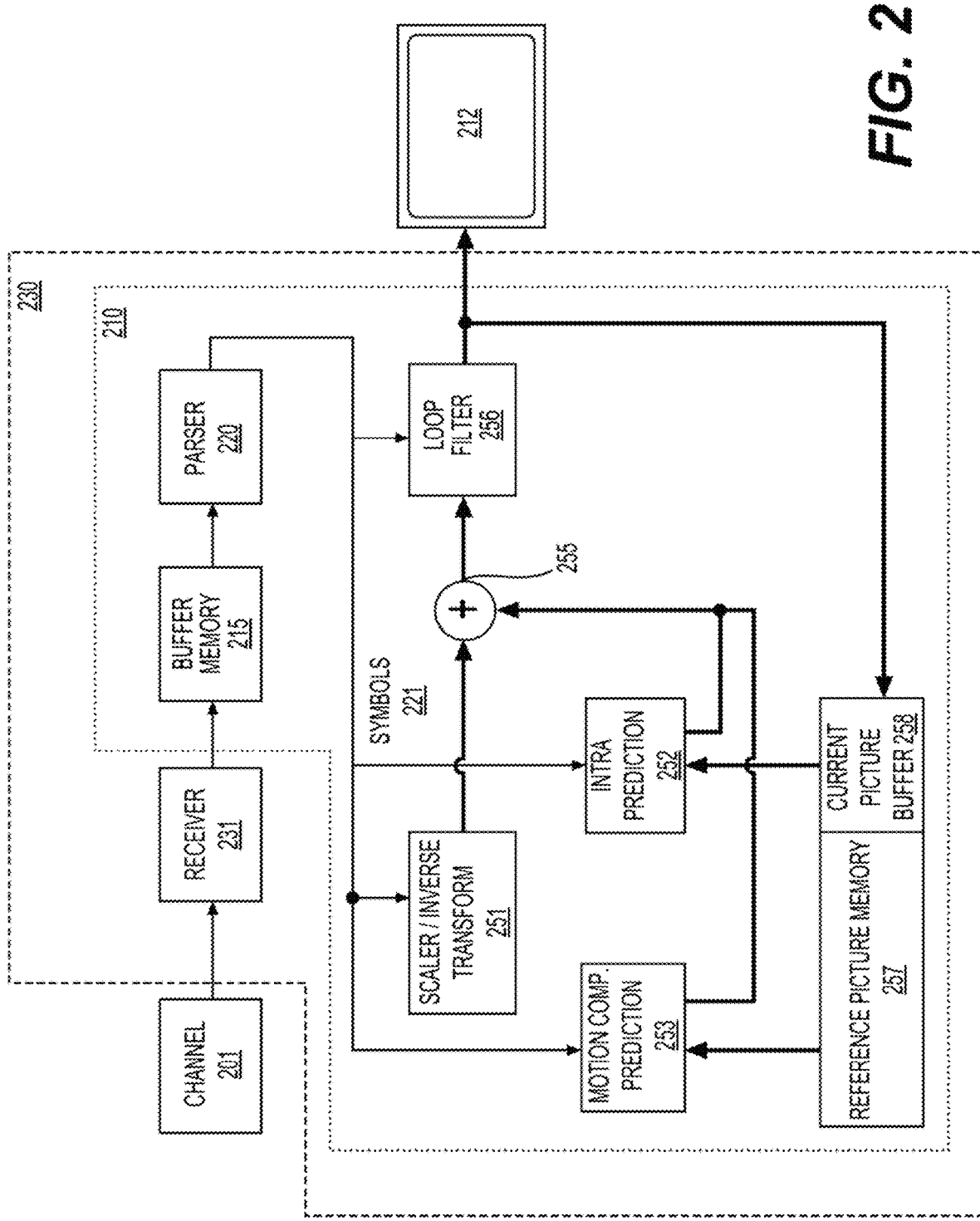
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
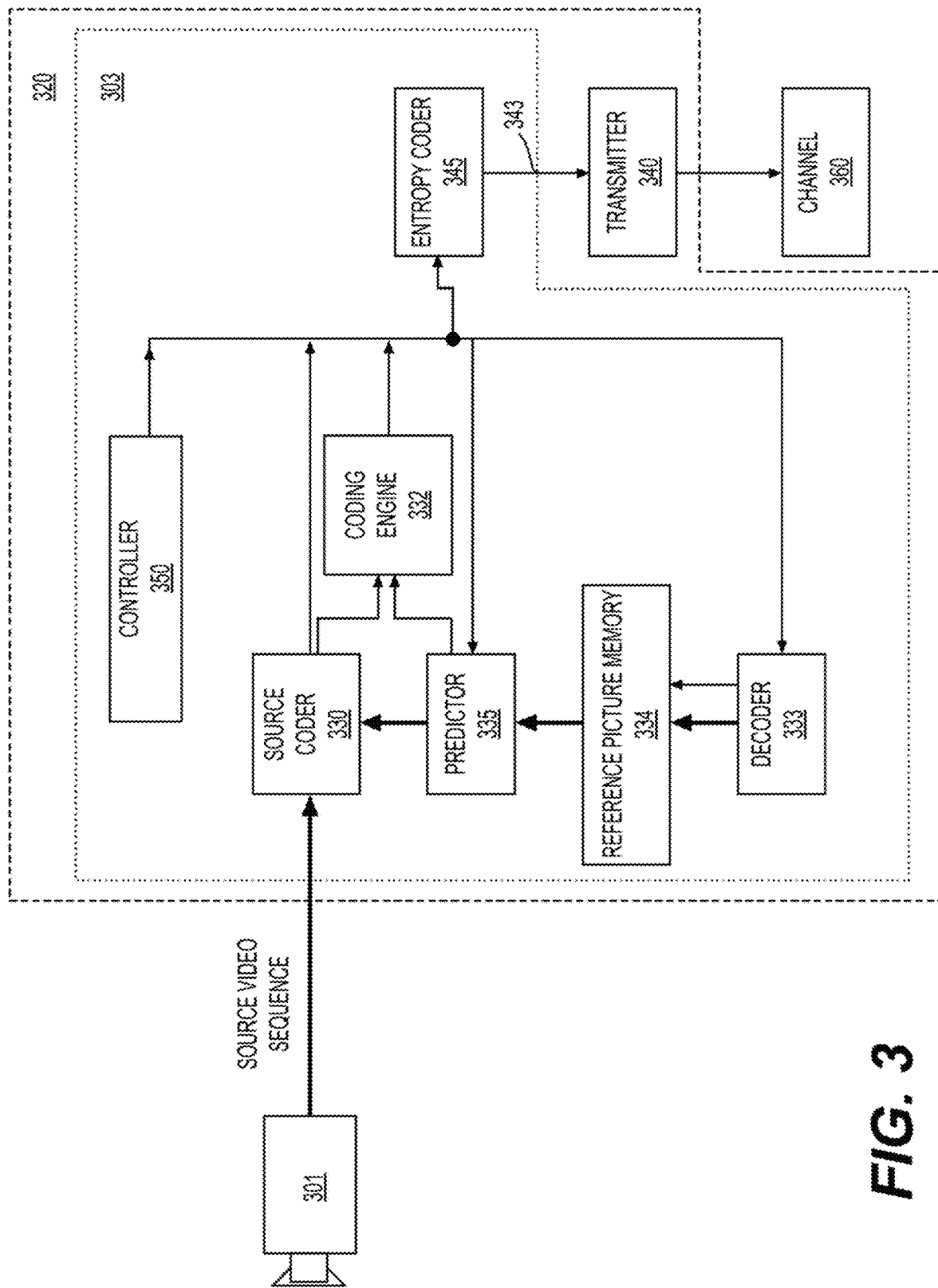
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create.

The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to deriving a partition pattern using template matching.

A geometric partitioning mode (GPM) can be applied for an inter prediction, such as in VVC. The geometric partitioning mode can be signalled using a flag (e.g., a CU-level flag) as one kind of merge mode. Other kinds of merge modes can include a regular merge mode, a merge motion vector differences (MMVD) mode, a combined inter and intra prediction (CIIP) mode, and a subblock merge mode. In an example, 64 partitions can be supported by the GPM for each possible CU with a size of w×h=$2^m$×$2^n$, where m, n∈{3 . . . 6} excluding 8×64 and 6×48.

Figure 4:
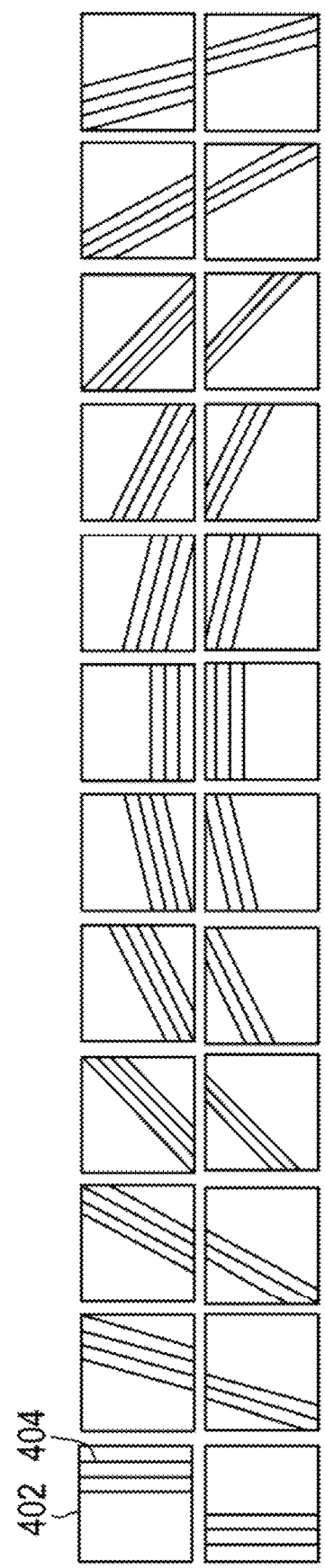
FIG. 4 shows exemplary geometric partitioning mode (GPM) splits grouped by identical angles.

When the GPM is used, a CU can be split into two parts by a geometrically located straight line (e.g., (404)). A location of the splitting line can be mathematically derived from an angle and offset parameters of a specific partition. FIG. 4 shows exemplary GPM splits that are grouped by identical angles. As shown in FIG. 4, each CU (e.g., (402)) can include a respective group of partition lines. Each partition line (e.g., (404)) can indicate a partitioning manner and correspond to a respective offset. The group of partition lines in each CU can include up to 4 partition lines that correspond to a respective angle. Each part of a geometric partition in a CU can be inter-predicted using a respective motion. Uni-prediction can be allowed for each partition. For example, each part (or each partition) can have one motion vector and one reference index. The uni-prediction motion constraint can be applied to ensure that, same as a conventional bi-prediction, two motion compensated predictions are needed for each CU.

If a geometric partitioning mode is used for a current CU, then a geometric partition index indicating a partition mode of the geometric partition (e.g., an angle and an offset), and two merge indices (one for each partition) can further be signalled. A maximum GPM candidate size can be signalled explicitly in a sequence parameter set (SPS) and specify a syntax binarization for GPM merge indices. After predicting each of the geometric partitions, sample values along a geometric partition edge can be adjusted using a blending processing with adaptive weights. Accordingly, a prediction signal for the whole CU based on the GPM can be obtained. A transform and quantization process can be applied to the whole CU as in other prediction modes. Further, a motion field of a CU predicted using the geometric partition mode can be stored.

Geometric partition mode can be stored in a motion field. For example, Mv1 from a first part of a geometric partition, Mv2 from a second part of the geometric partition, and a combined Mv of Mv1 and Mv2 can be stored in a motion filed of a geometric partitioning mode coded CU. The stored motion vector type for each individual position in the motion filed can be determined as follows in equation (1):

$$sType=abs(motionIdx)<32?2:(motionIdx\leq 0?(1-partIdx):partIdx) \quad \text{Eq. (1)}$$

where motionIdx can be equal to d(4x+2, 4y+2) that can be recalculated from equation (2) as follows:

$$d(x,y)=(2x+1-w)\cos(\varphi_i)+(2y+1-h)\sin(\varphi_i)-p_j \quad \text{Eq. (2)}$$

The partIdx can depend on an angle index i. d(x, y) can indicate a position (x, y) to a partition edge of the geometric partition. $p_j$ can be a distance between a center point of the current block and the partition edge. $\varphi_i$ can be an angle between a first line extending through the center point of the current block in a horizontal direction and a second line extending through the center point of the current block and perpendicular to the partition edge. If sType is equal to 0 or 1, Mv0 or Mv1 can be stored in the corresponding motion field. Otherwise, if sType is equal to 2, a combined Mv from Mv0 and Mv2 can be stored. The combined Mv can be generated using the following process:

(1) If Mv1 and Mv2 are from different reference picture lists (e.g., one from L0 and the other from L1), then Mv1 and Mv2 are simply combined to form the bi-prediction motion vectors.

(2) Otherwise, if Mv1 and Mv2 are from the same list, only uni-prediction motion Mv2 is stored.

Template matching can be applied to GPM. When GPM mode is enabled for a CU, a CU-level flag can be signaled to indicate whether TM is applied to both geometric partitions. Motion information for each geometric partition can be refined using TM. When TM is chosen, a template can be constructed using a left, an above, or a left and an above neighboring samples according to a partition angle, as shown in Table 1. The motion can then be refined by minimizing a difference between the current template and the template in the reference picture using a same search pattern of a merge mode in which a half-pel interpolation filter is disabled. Table 1 shows exemplary templates for a first geometric partition and a second geometric partition in GPM, where A represents use of above samples, L represents use of left samples, and L+A represent use of both left and above samples.

The GPM-MMVD and GPM-TM can be exclusively enabled to one GPM CU. For example, a GPM-MMVD syntax can be signaled at first. When both GPM-MMVD control flags are equal to false, which indicates the GPM-MMVD are disabled for two GPM partitions, the GPM-TM flag can be signaled to indicate whether the template matching is applied to the two GPM partitions. Otherwise, when at least one GPM-MMVD flag is equal to true, the value of the GPM-TM flag can be inferred as false.

Figure 5D:
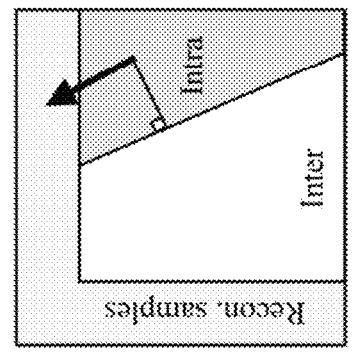
FIG. 5D shows exemplary GPM with an intra prediction and an intra prediction.
Figure 5C:
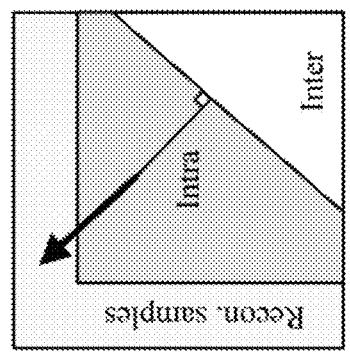
FIGS. 5A, 5B, and 5C show exemplary GPM with an inter prediction and an intra prediction.
Figure 5B:
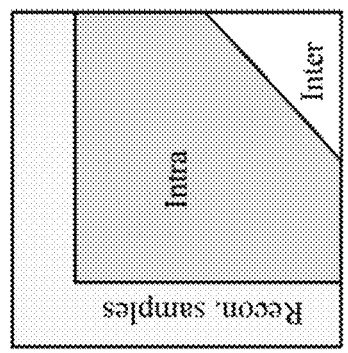
Figure 5A:
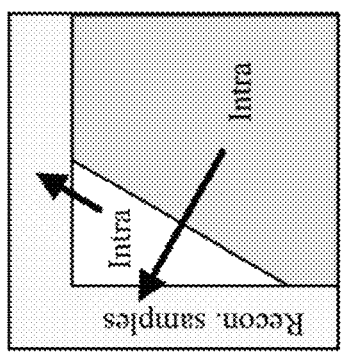

When GPM with inter and intra prediction is applied, final prediction samples can be generated by weighting inter predicted samples and intra predicted samples for each GPM-separated region. The inter predicted samples can be derived by inter GPM. The intra predicted samples can be derived by an intra prediction mode (IPM) candidate list and an index signaled from an encoder. The IPM candidate list size can be pre-defined, such as 3. The available IPM candidates can include a parallel angular mode against a GPM block boundary (e.g., parallel mode), a perpendicular angular mode against the GPM block boundary (e.g., perpendicular mode), and a Planar mode, which can be shown in FIGS. 5A, 5B, and 5C, respectively. Furthermore, as shown in FIG. 5D, GPM with intra and intra prediction can be restricted to reduce a signalling overhead for IPMs and avoid an increase in a size of an intra prediction circuit on a hardware decoder. In addition, a direct motion vector and IPM storage on the GPM-blending area can be introduced to further improve the coding performance.

TABLE 1

Exemplary templates for partitions in GPM

| Partition angle | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |
| Partition angle | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

In an aspect, a GPM candidate list can be constructed as follows:

(1) Interleaved List-0 MV candidates and List-1 MV candidates can be derived directly from a regular merge candidate list, where the List-0 MV candidates can have a higher priority than the List-1 MV candidates. A pruning method with an adaptive threshold based on the current CU size can be applied to remove redundant MV candidates.

(2) Interleaved List-1 MV candidates and List-0 MV candidates can further be derived directly from the regular merge candidate list, where the List-1 MV candidates can have a higher priority than the List-0 MV candidates. A same pruning method with the adaptive threshold can also be applied to remove redundant MV candidates.

(3) Zero MV candidates can be padded until the GPM candidate list is full.

In decoder-side intra mode derivation (DIMD) and a neighboring mode based IPM derivation, a parallel mode can be registered first. Therefore, a maximum of two IPM candidates derived from the DIMD method and/or the neighboring blocks can be registered if a same IPM candidate is not in the IPM candidate list. For the neighboring mode based IPM derivation, up to five positions can be defined to determine available neighboring blocks. However, the five positions can be restricted by an angle of a GPM block boundary as shown in Table 2, in which GPM with template matching (GPM-TM) is applied. As shown in Table 2, the positions of available neighboring blocks for IPM candidate derivation can be defined based on the angle of the GPM block boundary. A and L denotes an above and a left side of a prediction block.

TABLE 2

| Positions of available neighboring blocks for IPM candidate derivation | | | | | | | | | |
|---|---|---|---|---|---|---|---|---|---|
| Angle of GPM | 0 | 2 | 3 | 4 | 5 | 8 | 11 | 12 | 13 | 14 |
| 1st partition | A | A | A | A | L + A | L + A | L + A | L + A | A | A |
| 2nd partition | L + A | L + A | L + A | L | L | L | L | L + A | L + A | L + A |
| Partition angle | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

In an aspect, GPM-intra can be combined with GPM with merge motion vector difference (GPM-MMVD). In an aspect, template-based intra mode derivation (TIMD) can be used for deriving IPM candidates of GPM-intra to further improve the coding performance. In an aspect, the Parallel mode can be registered first, then IPM candidates of TIMD, DIMD, and neighboring blocks can be registered subsequently.

Current GPM design only allows for a limited set of pre-defined partitioning patterns, using a straight line, as partitioning boundaries, which may not always model a most efficient partitioning pattern, such as an irregular partitioning pattern. A motion vector can be used to identify a block in a reference picture or a current picture and use a reconstructed value of the identified block to derive an adaptive partitioning pattern. However, the related example may require signalling of an additional motion vector, which may be costly to specify the partitioning pattern.

Figure 6A:
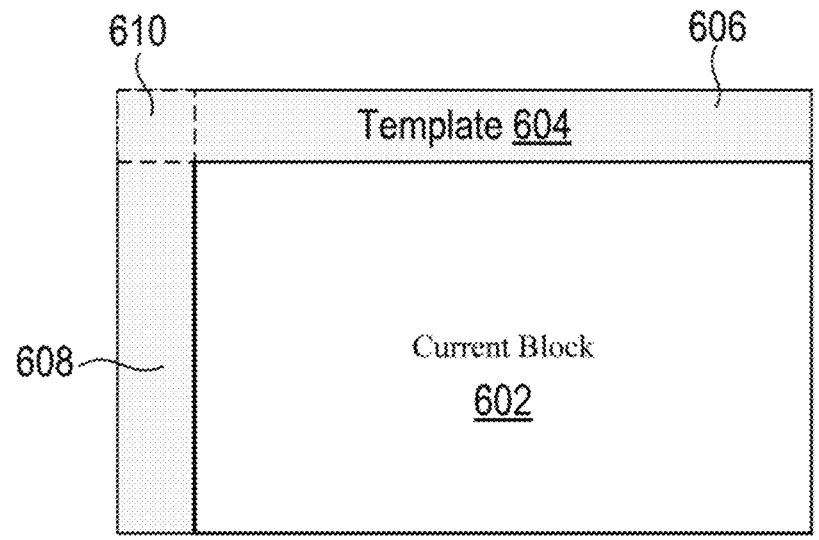
FIG. 6A shows a first exemplary template of a block according to some embodiments of the disclosure.
Figure 6B:
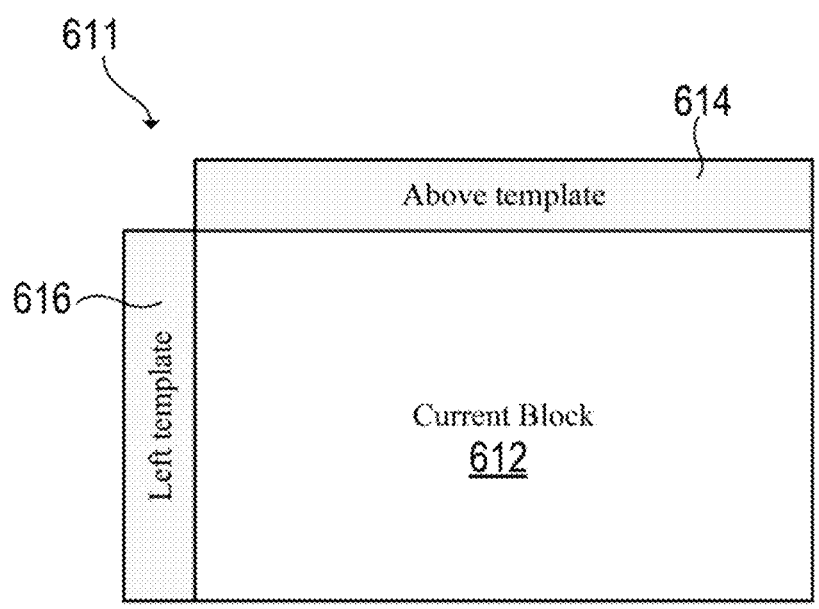
FIG. 6B shows a second exemplary template of a block according to some embodiments of the disclosure.

In the disclosure, template matching-based partitioning pattern derivation can be provided. In the disclosure, a template can refer to neighboring samples of the block, such as top, left, right, and/or bottom neighboring samples of a block. Exemplary templates can be shown in FIGS. 6A and 6B. As shown in FIG. 6A, a template (604) can include both top neighboring reconstructed samples (606) and left neighboring reconstructed samples (608) of a current block (602). The template (604) can also include reconstructed samples (610) at a top-left corner of the current block (602). As shown in FIG. 6B, a template (611) can include an above template (614) at a top side of a current block (612) and a left template (616) at a left side of the current block (612). In an aspect, when the right or bottom samples of the current block in a current frame are already reconstructed, the right or bottom samples can be used as the template.

In the disclosure, template matching can be used to identify a reference block in a reference picture. The identified reference block can be used to derive a geometric partitioning pattern of a current block. Each partitioning of the derived geometric partitioning pattern for the current block can apply a different motion. In an example, a plurality of partitions of the current block can be determined based on the derived geometric partitioning pattern. The derived geometric partitioning pattern can divide samples of the current block into a plurality of groups. Each of the plurality of partitions can correspond to a respective group of samples of the current block.

In an example, a reference block can be determined from a plurality of candidate reference blocks for a current block based on template matching (TM) costs of the plurality of candidate reference blocks. The TM costs can indicate differences between a template of the current block and respective reference templates of the plurality of candidate reference blocks. Samples (e.g., reconstructed samples) of the determined reference block can be classified into a plurality of classes of reconstructed samples. A plurality of partitions of the current block corresponding to the plurality of classes of reconstructed samples of the determined reference block can be determined. Each of the plurality of classes of reconstructed samples of the determined reference block can correspond to a respective partition of the plurality of partitions of the current block.

In an aspect, a template of a current block can be constructed using neighboring samples, such as left, above, or left and above neighboring samples of the current block. A template of a candidate reference block in a reference picture can be constructed using neighboring samples, such as left, above, or left and above neighboring samples of the reference block. The reference block which minimizes a cost between the current template (e.g., the template of the current block) and the reference template (e.g., the template of the reference block) among the reference blocks can be identified. The identified reference block which corresponds to the minimized cost can be used to derive the partitioning pattern of the current block.

In an example, an exemplary template of a current block can be shown in FIGS. 6A and 6B.

In an example, an initial reference block can be determined based on motion vector information included in the received video bitstream. The plurality of candidate reference blocks can be determined within a search range of the initial reference block. TM costs between the reference template of each of the plurality of candidate reference blocks and the template of the current block can be determined. The reference block can be determined from the plurality of candidate reference blocks that corresponds to a minimum TM cost among the determined TM costs between the reference template of each of the plurality of candidate reference blocks and the template of the current block.

In an aspect, reconstructed samples of an identified block, such as a block identified based on template matching, can be used to derive a partitioning pattern.

In an aspect, a binary image segmentation algorithm can be applied to an identified block. An outcoming binary map of the binary image segmentation algorithm can be used as a partitioning pattern.

In an example, the reconstructed samples of the determined reference block can be classified into a first class of reconstructed samples and a second class of reconstructed samples based on a binary image segmentation algorithm.

In an aspect, a threshold value of reconstructed samples of an identified block can be first calculated. The identified block can be partitioned into two partitions. A first partition can include samples with a value (or sample value) greater than (or greater than and equal to) the threshold value and a second partition can include samples with a value (or sample value) less (or less than and equal to) than the threshold value, respectively. In an example, the threshold value can be an average value of the reconstructed samples of the identified block. In an example, the threshold value can be a median value of the reconstructed samples of the identified block.

In an example, the reconstructed samples of the determined reference block can be classified into a first class of reconstructed samples with sample values that are larger than a threshold value and a second class of reconstructed samples with sample values that are less than the threshold value. The threshold value may be based on one or more sample values of the identified block. In an example, the threshold value can be one of an average value of the reconstructed samples and a median value of the reconstructed samples.

In an aspect, a clustering method can be applied on the reconstructed samples of the identified block to derive two or more classes of samples. The samples associated with each class can construct one of the multiple partitions.

In an example, the clustering method can include a Hierarchical model, a Partitioning model, a Density-based model, a Model-based model, and a Grid-based model, or any other suitable clustering methods.

In an aspect, an edge detection method can be applied to classify reconstructed samples of an identified block into two or more classes. The samples associated with each class can construct one of the multiple partitions.

In an example, based on the edge detection, the reconstructed samples of the identified block can be classified into an edge group and an inner group. The edge group can include the reconstructed samples at edges of the identified block, and the inner group can include the reconstructed samples at an inner region of the identified block. The inner region can be surrounded by the edges of the identified block.

In an example, a template area adjacent to the determined reference block can be determined. The reconstructed samples of the determined reference block can be classified into one or more classes of reconstructed samples based on sample values of the template area adjacent to the determined reference block in an edge detection. The one or more classes of reconstructed samples can include at least a first class that includes the reconstructed samples at edges of the determined reference block and a second class that includes the reconstructed samples at an inner region of the determined reference block.

In an example, the edge detection method can include a Sobel method, a Canny method, a Prewitt method, a Roberts method, a fuzzy logic method, or any other suitable edge detection methods.

In an example, edge detection can include a variety of mathematical methods (e.g., the Sobel method, the Canny method, the Prewitt method, the Roberts method, the fuzzy logic method) that aim at identifying edges and/or curves in a digital image at which an image brightness changes sharply or has discontinuities.

In an aspect, a template area used for an edge detection can be extended to multiple rows or columns of samples or be extended from one or more reconstructed neighboring blocks.

In an example, a template area adjacent to the determined reference block can be determined. The reconstructed samples of the determined reference block can be classified into one or more classes of reconstructed samples based on sample values of the template area adjacent to the determined reference block in an edge detection.

In an aspect, when reconstructed samples are available, a width or a height of the template area used for an edge detection can be larger than a width or a height of a current block. For example, the template area can have size equal to a twice of the block width or a twice of the block height.

In an example, the template area can include one of (i) a plurality of rows of neighboring samples at a top side of the determined reference block, (ii) a plurality of columns of neighboring samples at a left side of the determined reference block, or (iii) a region in one or more reconstructed neighboring blocks of the determined reference block.

In an aspect, multiple partitioning boundary candidates can be applied on reconstructed samples of an identified block. A candidate partitioning boundary, which minimizes a pre-defined cost score, can be derived as a partitioning boundary of a GPM mode for a current block. In an example, a plurality of partitions of the current block can be determined based on the derived partitioning boundary. The derived partitioning boundary can divide samples of the current block into a plurality of groups. Each of the plurality of partitions can correspond to a respective group of the samples of the current block.

In an example, the reconstructed samples of the determined reference block can be classified based on each of a plurality of candidate partitioning boundaries. A plurality of candidate partitioning boundaries for the current block can be determined, where each of the plurality of candidate partitioning boundaries for the current block corresponds to a respective one of the plurality of candidate partitioning boundaries for the determined reference block. A TM cost between each of the plurality of candidate partitioning boundaries for the reconstructed samples of the determined reference block and a corresponding one of the plurality of candidate partitioning boundaries for samples of the current block can be determined. A partitioning boundary can be determined from the plurality of candidate partitioning boundaries for the current block that corresponds to a minimum TM cost among the determined TM costs. The plurality of partitions of the current block can be determined based on the determined partitioning boundary.

In an aspect, a binary mask can be derived based on a current template, and the template-matching operation can be applied on both the current and reference templates using the derived binary mask to identify a block in the reference picture. The identified block can be used to derive a geometric partitioning pattern of a current block, and each partitioning may apply a different motion.

In an example, a binary mask can define a region of interest (ROI) of an image (or a block). In a binary mask, image pixels (or samples) of an image with a first mask pixel value (e.g., 1) can belong to the ROI (or majority group). Image pixels of the image with a second mask pixel value (e.g., 0) can belong to a background (or minority group). In an example, a ROI of an image can include samples of the image that has a sample value larger than a threshold sample value of the image. The threshold sample value of the image can be an average sample value, a median sample value of the image, or a mean sample value of the image.

A binary mask can be determined based on reconstructed sample values of the template of the current block. In an example, one of an average value and a median value of reconstructed samples of the template of the current block is used to determine the binary mask. A dominant sample group in the reconstructed samples of the template of the current block can be determined based a frequency of sample values or sample value ranges. For example, the dominant sample group may be determined based on the binary mask. A dominant sample group in samples of a reference template of each of the plurality of candidate reference blocks can be determined based on the binary mask. A TM cost between the dominant group in the reconstructed samples of the template of the current block and the dominant group in the samples of the reference template of each of the plurality of candidate reference blocks can be determined. The reference block can be determined from the plurality of candidate reference blocks that corresponds to a minimum TM cost among the determined TM costs between the dominant group in the reconstructed samples of the template of the current block and the dominant group in the samples of the reference template of each of the plurality of candidate reference blocks.

In an aspect, a threshold value of the reconstructed samples of the current template can first be calculated. At least one binary mask can be derived by labeling each sample in the current template based on whether the respective sample is greater than (or equal to) the threshold value or not. When a template matching cost is calculated, samples with a dominant label can be used, and remaining samples may not be considered for calculating template matching cost. The dominant label, which indicates a majority group, can indicate a label value (e.g., 0 or 1) that is associated with more (or less) samples than another label value.

In an example, a dominant label can indicate a dominant group (or majority group) of the reconstructed samples of the current template. For example, when the reconstructed samples with sample values equal to or larger than the threshold value are more than the reconstructed samples with sample values less than the threshold value, the dominant group can include the reconstructed samples with the sample values equal to or larger than the threshold value.

the threshold value may be derived from one or more values of the reconstructed samples of the current template. In an aspect, the threshold value can be an average value of the reconstructed samples of the current template. In an aspect, the threshold value can be a median value of the reconstructed samples of the current template.

In an aspect, a MV between a current template and a reference template can be used for a motion compensation of an associated geometric partition. The MV can indicate an offset between the dominant group in the current template and the dominant group in the reference template according to the binary mask.

In an aspect, a partitioning pattern, which can be associated with an identified block coded by GPM or derived using the template matching method in a reference picture, can be used to derive a partitioning pattern of the current block.

In an aspect, template matching can be applied using motion vectors associated with a current block to identify reference block candidates for template matching.

In an example, the plurality of candidate reference blocks can be determined based on a plurality of motion vectors associated with the current block.

In an aspect, a motion vector different (MVD) can be further signaled on top of template matching to identify a reference block. The MVD can be coded using a simplified MVD coding scheme, such as MMVD. Accordingly, a reference block can be determined based on a MV that is equal to a sum of a TM determined by the template determined and MVD.

In an example, a TM cost between a reference template of each of the plurality of candidate reference blocks and the template of the current block can be determined. A candidate reference block can be determined from the plurality of candidate reference blocks that corresponds to a minimum TM cost among the determined TM costs between the reference template of each of the plurality of candidate reference blocks and the template of the current block. A motion vector (MV) can be determined based on the determined candidate reference block. The motion vector can indicate an offset between the current block and the determined candidate reference block. An adjusted MV can be determined based on the determined MV and a motion vector difference (MVD). The reference block can be determined based on the adjusted MV.

In an aspect, template matching can be applied to identify a block in a current picture and the identified block can be used to derive a partitioning pattern. The candidate reference block can be determined in already reconstructed areas of the current picture.

In an aspect, similar to a block vector (BV) in intra block copy (IBC) mode, a derived BV (and/or corresponding BV offset) pointing to a reference block can be in an integer sample (e.g., in luma samples) resolution.

In an aspect, the BV (and/or corresponding BV offset) pointing to the reference block can be in a sub-pixel resolution.

In an example, the plurality of candidate reference blocks can be determined in the current picture. A TM cost between a reference template of each of the plurality of candidate reference blocks and the template of the current block can be determined. A candidate reference block can be determined from the plurality of candidate reference blocks that corresponds to a minimum TM cost among the determined TM costs between the reference template of each of the plurality of candidate reference blocks and the template of the current block. A block vector (BV) can be determined based on the determined candidate reference block, where the BV can indicate an offset between the current block and the determined candidate reference block. The reference block is determined based on the determined BV.

In an aspect, an additional MV can be signaled to indicate a starting position of an identified block in a reference picture. Template-matching can further be applied on top of the starting position to find a best matched identified block. The identified block can further be used to derive a partitioning pattern.

Figure 7:
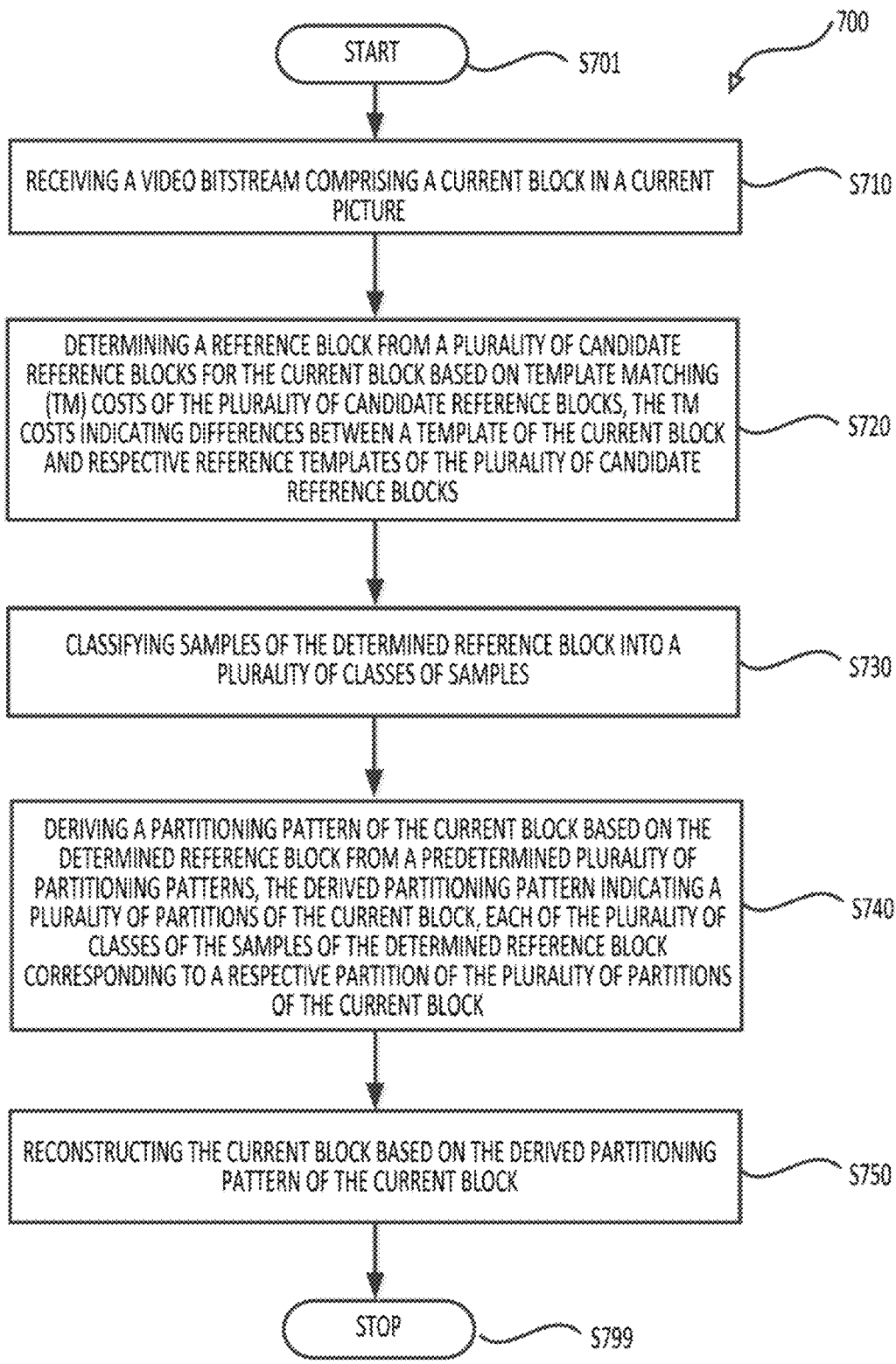
FIG. 7 shows a flow chart outlining a decoding process according to some embodiments of the disclosure.

FIG. 7 shows a flow chart outlining a process (700) according to an embodiment of the disclosure. The process (700) can be used in a video decoder. In various embodiments, the process (700) is executed by processing circuitry, such as the processing circuitry that performs functions of the video decoder (110), the processing circuitry that performs functions of the video decoder (210), and the like. In some embodiments, the process (700) is implemented in software instructions, thus when the processing circuitry executes the software instructions, the processing circuitry performs the process (700). The process starts at (S701) and proceeds to (S710).

At (S710), a video bitstream comprising a current block in a current picture is received.

At (S720), a reference block is determined from a plurality of candidate reference blocks for the current block based on template matching (TM) costs of the plurality of candidate reference blocks. The TM costs indicate differences between a template of the current block and respective reference templates of the plurality of candidate reference blocks.

At (S730), samples of the determined reference block are classified into a plurality of classes of samples.

AT (S740), a partitioning pattern of the current block is derived based on the determined reference block from a predetermined plurality of partitioning patterns. The derived partitioning pattern indicates a plurality of partitions of the current block. Each of the plurality of classes of the samples of the determined reference block corresponds to a respective partition of the plurality of partitions of the current block.

At (S750), the current block is reconstructed based on the derived partitioning pattern of the current block.

In an aspect, the plurality of candidate reference blocks is from one of the current picture and a reference picture of the current block. The samples of the determined reference block are reconstructed samples.

In an example, an initial reference block is determined based on motion vector information included in the received video bitstream. The plurality of candidate reference blocks is determined within a search range of the initial reference block. The TM costs between the reference template of each of the plurality of candidate reference blocks and the template of the current block are determined. The reference block is determined from the plurality of candidate reference blocks that corresponds to a minimum TM cost among the determined TM costs between the reference template of each of the plurality of candidate reference blocks and the template of the current block.

In an example, the samples of the determined reference block are classified into a first class of samples and a second class of samples based on a binary image segmentation algorithm.

In an example, the samples of the determined reference block are classified into a first class of samples with sample values that are larger than a threshold value and a second class of samples with sample values that are less than the threshold value. The threshold value is one of an average value of the samples and a median value of the samples.

In an example, the samples of the determined reference block are clustered into one or more classes of samples in a clustering method.

In an example, a template area adjacent to the determined reference block is determined. The samples of the determined reference block are classified into one or more classes of samples based on sample values of the template area adjacent to the determined reference block in an edge detection. The one or more classes of samples include at least a first class that includes the samples at edges of the determined reference block and a second class that includes the samples at an inner region of the determined reference block.

In an example, the template area includes one of (i) a plurality of rows of neighboring samples at a top side of the determined reference block, (ii) a plurality of columns of neighboring samples at a left side of the determined reference block, or (iii) a region in one or more reconstructed neighboring blocks of the determined reference block.

In an example, the samples of the determined reference block are classified based on each of a plurality of candidate partitioning boundaries. A plurality of candidate partitioning boundaries for the current block is determined, where each of the plurality of candidate partitioning boundaries for the current block corresponds to a respective one of the plurality of candidate partitioning boundaries for the determined reference block. A TM cost between each of the plurality of candidate partitioning boundaries for the samples of the determined reference block and a corresponding one of the plurality of candidate partitioning boundaries for samples of the current block is determined. A partitioning boundary is determined from the plurality of candidate partitioning boundaries for the current block that corresponds to a minimum TM cost among the determined TM costs. The plurality of partitions of the current block is determined based on the determined partitioning boundary.

In an example, a binary mask is determined based on one of an average value and a median value of reconstructed samples of the template of the current block. A dominant sample group in the reconstructed samples of the template of the current block is determined based on the binary mask. A dominant sample group in samples of a reference template of each of the plurality of candidate reference blocks is determined based on the binary mask. A TM cost between the dominant group in the reconstructed samples of the template of the current block and the dominant group in the samples of the reference template of each of the plurality of candidate reference blocks is determined. The reference block is determined from the plurality of candidate reference blocks that corresponds to a minimum TM cost among the determined TM costs between the dominant group in the reconstructed samples of the template of the current block and the dominant group in the samples of the reference template of each of the plurality of candidate reference blocks.

In an example, the plurality of candidate reference blocks is determined based on a plurality of motion vectors associated with the current block.

In an example, a TM cost between a reference template of each of the plurality of candidate reference blocks and the template of the current block is determined. A candidate reference block is determined from the plurality of candidate reference blocks that corresponds to a minimum TM cost among the determined TM costs between the reference template of each of the plurality of candidate reference blocks and the template of the current block. A motion vector (MV) is determined based on the determined candidate reference block. The motion vector indicates an offset between the current block and the determined candidate reference block. An adjusted MV is determined based on the determined MV and a motion vector difference (MVD). The reference block is determined based on the adjusted MV.

In an example, the plurality of candidate reference blocks is determined in the current picture. A TM cost between a reference template of each of the plurality of candidate reference blocks and the template of the current block is determined. A candidate reference block is determined from the plurality of candidate reference blocks that corresponds to a minimum TM cost among the determined TM costs between the reference template of each of the plurality of candidate reference blocks and the template of the current block. A block vector (BV) is determined based on the determined candidate reference block, where the BV indicates an offset between the current block and the determined candidate reference block. The reference block is determined based on the determined BV.

Then, the process proceeds to (S799) and terminates.

The process (700) can be suitably adapted. Step(s) in the process (700) can be modified and/or omitted. Additional step(s) can be added. Any suitable order of implementation can be used.

Figure 8:
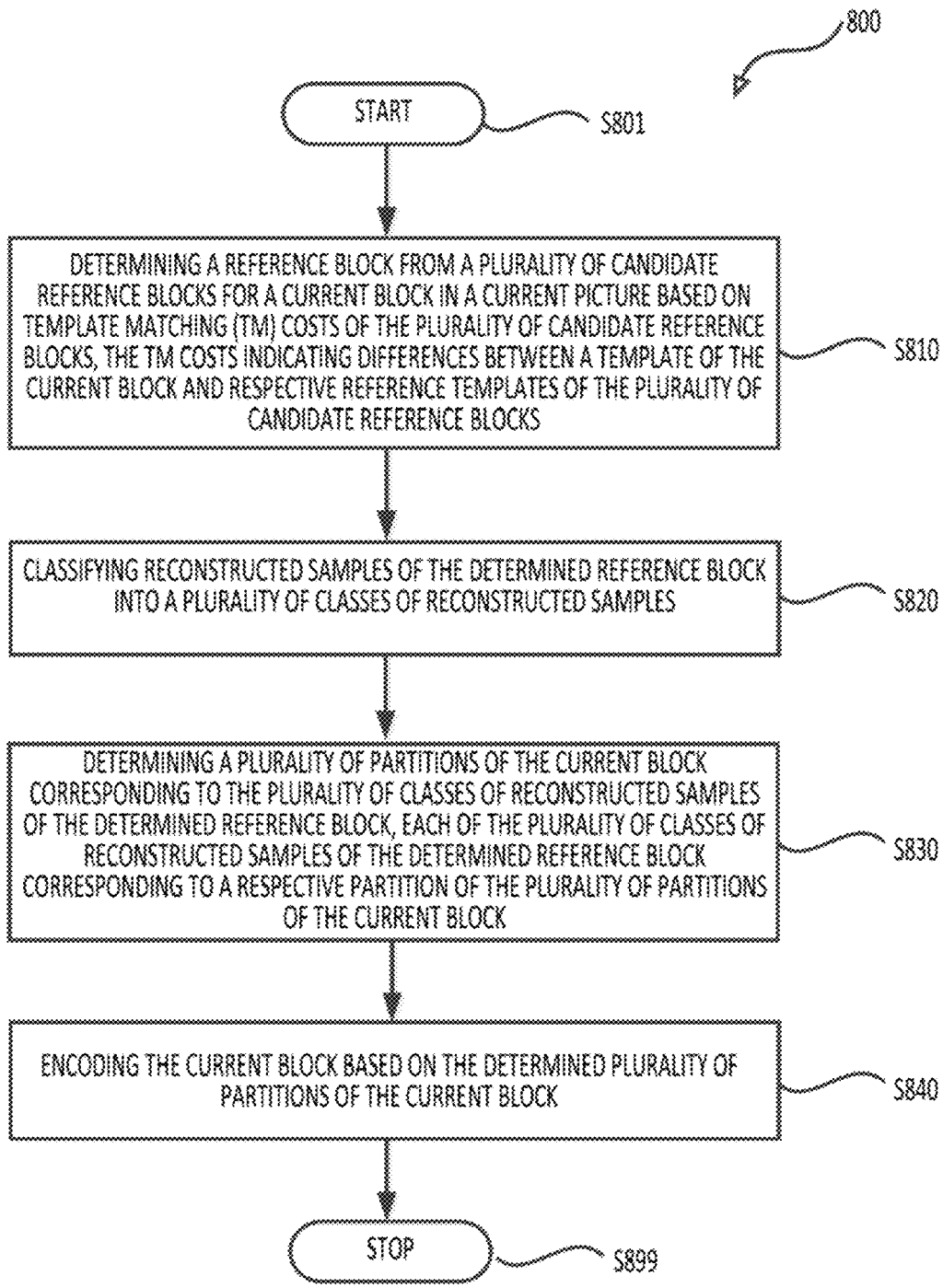
FIG. 8 shows a flow chart outlining an encoding process according to some embodiments of the disclosure.

FIG. 8 shows a flow chart outlining a process (800) according to an embodiment of the disclosure. The process (800) can be used in a video encoder. In various embodiments, the process (800) is executed by processing circuitry, such as the processing circuitry that performs functions of the video encoder (103), the processing circuitry that performs functions of the video encoder (303), and the like. In some embodiments, the process (800) is implemented in software instructions, thus when the processing circuitry executes the software instructions, the processing circuitry performs the process (800). The process starts at (S801) and proceeds to (S810).

At (S810), a reference block is determined from a plurality of candidate reference blocks for a current block in a current picture based on TM costs of the plurality of candidate reference blocks, where the TM costs indicate differences between a template of the current block and respective reference templates of the plurality of candidate reference blocks.

At (S820), reconstructed samples of the determined reference block are classified into a plurality of classes of reconstructed samples.

At (S830), a plurality of partitions of the current block corresponding to the plurality of classes of reconstructed samples of the determined reference block is determined. Where each of the plurality of classes of reconstructed samples of the determined reference block corresponds to a respective partition of the plurality of partitions of the current block At (S840), the current block is reconstructed based on the determined plurality of partitions of the current block.

Then, the process proceeds to (S899) and terminates.

The process (800) can be suitably adapted. Step(s) in the process (800) can be modified and/or omitted. Additional step(s) can be added. Any suitable order of implementation can be used.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
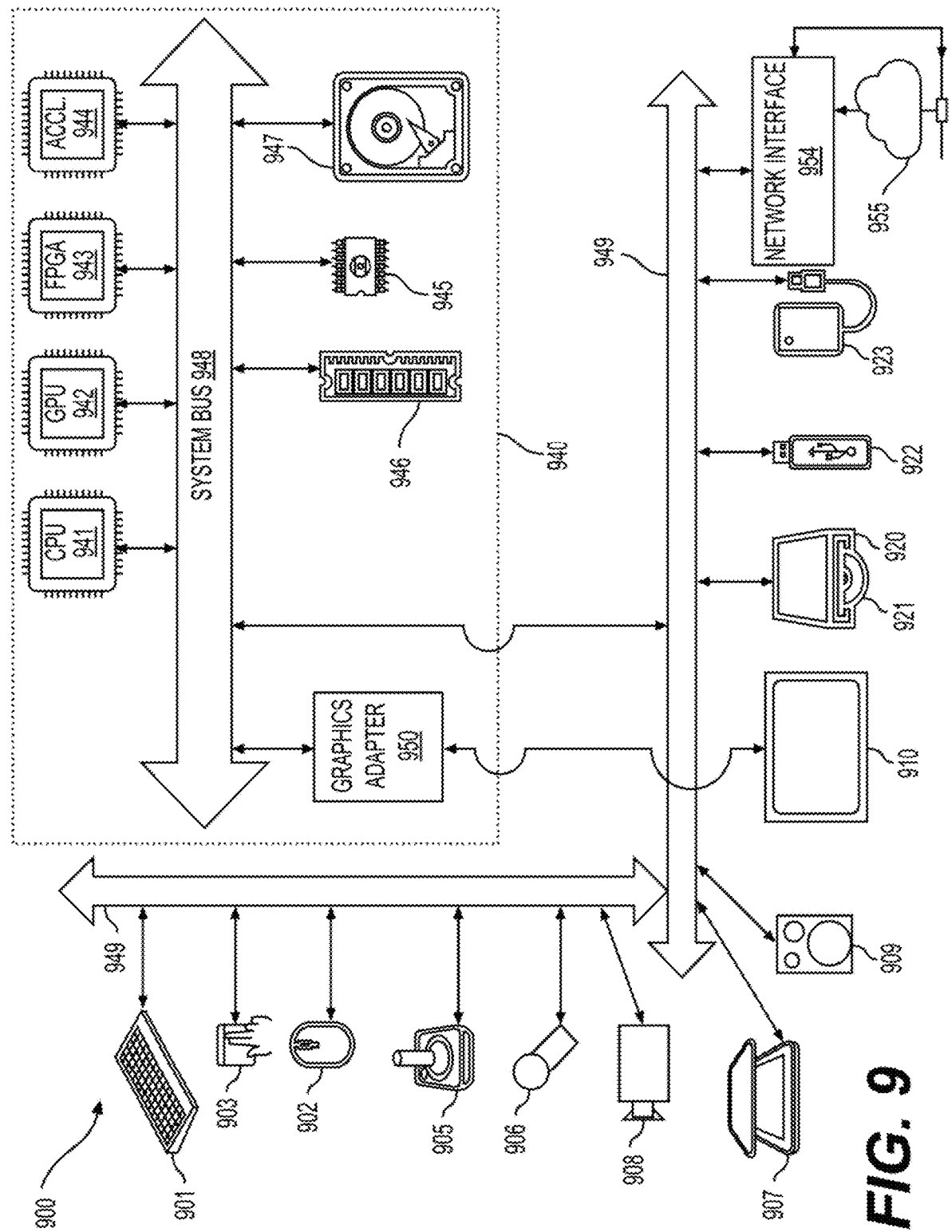
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:
   receiving a video bitstream comprising a current block in a current picture;
   determining an initial reference block based on motion vector information included in the received video bitstream;
   determining a plurality of candidate reference blocks within a search range of the initial reference block;
   determining template matching (TM) costs between a reference template of each of the plurality of candidate reference blocks and a template of the current block;
   determining a reference block from the plurality of candidate reference blocks for the current block based on the TM costs of the plurality of candidate reference blocks, the TM costs indicating differences between the template of the current block and the respective reference templates of the plurality of candidate reference blocks, the reference block corresponding to a minimum TM cost among the determined TM costs between the reference template of each of the plurality of candidate reference blocks and the template of the current block;
   classifying samples of the determined reference block into a plurality of classes of samples;
   deriving a partitioning pattern of the current block based on the determined reference block from a predetermined plurality of partitioning patterns, the derived partitioning pattern indicating a plurality of partitions of the current block, each of the plurality of classes of the samples of the determined reference block corresponding to a respective partition of the plurality of partitions of the current block; and
   reconstructing the current block based on the derived partitioning pattern of the current block, wherein
   the plurality of candidate reference blocks is from one of the current picture and a reference picture of the current block, and
   the samples of the determined reference block are reconstructed samples.

2. The method of claim 1, wherein the classifying the samples of the determined reference block further comprises:

classifying the samples of the determined reference block into a first class of samples and a second class of samples based on a binary image segmentation algorithm.

3. The method of claim 1, wherein the classifying the samples of the determined reference block further comprises:
classifying the samples of the determined reference block into a first class of samples with sample values that are larger than a threshold value and a second class of samples with sample values that are less than the threshold value, the threshold value being one of an average value of the samples and a median value of the samples.

4. The method of claim 1, wherein the classifying the samples of the determined reference block further comprises:
clustering the samples of the determined reference block into one or more classes of samples in a clustering method.

5. The method of claim 1, wherein the classifying the samples of the determined reference block further comprises:
determining a template area adjacent to the determined reference block; and
classifying the samples of the determined reference block into one or more classes of samples based on sample values of the template area adjacent to the determined reference block in an edge detection, the one or more classes of samples including at least a first class that includes the samples at edges of the determined reference block and a second class that includes the samples at an inner region of the determined reference block.

6. The method of claim 5, wherein the template area includes one of (i) a plurality of rows of neighboring samples at a top side of the determined reference block, (ii) a plurality of columns of neighboring samples at a left side of the determined reference block, or (iii) a region in one or more reconstructed neighboring blocks of the determined reference block.

7. The method of claim 1, wherein:
the classifying the samples of the determined reference block further comprises classifying the samples of the determined reference block based on each of a plurality of candidate partitioning boundaries; and
the deriving the partitioning pattern of the current block further comprises:
determining a plurality of candidate partitioning boundaries for the current block, each of the plurality of candidate partitioning boundaries for the current block corresponding to a respective one of the plurality of candidate partitioning boundaries for the determined reference block;
determining a TM cost between each of the plurality of candidate partitioning boundaries for the samples of the determined reference block and a corresponding one of the plurality of candidate partitioning boundaries for samples of the current block;
determining a partitioning boundary from the plurality of candidate partitioning boundaries for the current block that corresponds to a minimum TM cost among the determined TM costs; and
determining the plurality of partitions of the current block based on the determined partitioning boundary.

8. The method of claim 1, wherein the determining the reference block from the plurality of candidate reference blocks further comprises:
determining a binary mask based on one of an average value and a median value of reconstructed samples of the template of the current block;
determining a dominant sample group in the reconstructed samples of the template of the current block based on the binary mask;
determining a dominant sample group in samples of a reference template of each of the plurality of candidate reference blocks based on the binary mask;
determining a TM cost between the dominant group in the reconstructed samples of the template of the current block and the dominant group in the samples of the reference template of each of the plurality of candidate reference blocks; and
determining the reference block from the plurality of candidate reference blocks that corresponds to a minimum TM cost among the determined TM costs between the dominant group in the reconstructed samples of the template of the current block and the dominant group in the samples of the reference template of each of the plurality of candidate reference blocks.

9. The method of claim 1, wherein the determining the plurality of candidate reference blocks further comprises:
determining the plurality of candidate reference blocks based on a plurality of motion vectors associated with the current block.

10. The method of claim 1, wherein the determining the reference block from the plurality of candidate reference blocks further comprises:
determining a candidate reference block from the plurality of candidate reference blocks that corresponds to the minimum TM cost among the determined TM costs between the reference template of each of the plurality of candidate reference blocks and the template of the current block;
determining a motion vector (MV) based on the determined candidate reference block, the motion vector indicating an offset between the current block and the determined candidate reference block;
determining an adjusted MV based on the determined MV and a motion vector difference (MVD); and
determining the reference block based on the adjusted MV.

11. The method of claim 1, wherein:
the plurality of candidate reference blocks is determined in the current picture, and
the determining the reference block from the plurality of candidate reference blocks further comprises:
determining a candidate reference block from the plurality of candidate reference blocks that corresponds to the minimum TM cost among the determined TM costs between the reference template of each of the plurality of candidate reference blocks and the template of the current block;
determining a block vector (BV) based on the determined candidate reference block, the BV indicating an offset between the current block and the determined candidate reference block; and
determining the reference block based on the determined BV.

12. An apparatus, comprising:
processing circuitry configured to:
receive a video bitstream comprising a current block in a current picture;

determine an initial reference block based on motion vector information included in the received video bitstream;

determine a plurality of candidate reference blocks within a search range of the initial reference block;

determine template matching (TM) costs between a reference template of each of the plurality of candidate reference blocks and a template of the current block;

determine a reference block from the plurality of candidate reference blocks for the current block based on the TM costs of the plurality of candidate reference blocks, the TM costs indicating differences between the template of the current block and the respective reference templates of the plurality of candidate reference blocks, the reference block corresponding to a minimum TM cost among the determined TM costs between the reference template of each of the plurality of candidate reference blocks and the template of the current block;

classify samples of the determined reference block into a plurality of classes of samples;

derive a partitioning pattern of the current block based on the determined reference block from a predetermined plurality of partitioning patterns, the derived partitioning pattern indicating a plurality of partitions of the current block, each of the plurality of classes of the samples of the determined reference block corresponding to a respective partition of the plurality of partitions of the current block; and reconstruct the current block based on the derived partitioning pattern of the current block, wherein the plurality of candidate reference blocks is from one of the current picture and a reference picture of the current block, and the samples of the determined reference block are reconstructed samples.

13. The apparatus of claim 12, wherein the processing circuitry is configured to:

classify the samples of the determined reference block into a first class of samples and a second class of samples based on a binary image segmentation algorithm.

14. The apparatus of claim 12, wherein the processing circuitry is configured to:

classify the samples of the determined reference block into a first class of samples with sample values that are larger than a threshold value and a second class of samples with sample values that are less than the threshold value, the threshold value being one of an average value of the samples and a median value of the samples.

15. The apparatus of claim 12, wherein the processing circuitry is configured to:

cluster the samples of the determined reference block into one or more classes of samples in a clustering method.

16. The apparatus of claim 12, wherein the processing circuitry is configured to:

determine a template area adjacent to the determined reference block; and classify the samples of the determined reference block into one or more classes of samples based on sample values of the template area adjacent to the determined reference block in an edge detection, the one or more classes of samples including at least a first class that includes the samples at edges of the determined reference block and a second class that includes the samples at an inner region of the determined reference block.

17. The apparatus of claim 16, wherein the template area includes one of (i) a plurality of rows of neighboring samples at a top side of the determined reference block, (ii) a plurality of columns of neighboring samples at a left side of the determined reference block, or (iii) a region in one or more reconstructed neighboring blocks of the determined reference block.

18. The apparatus of claim 12, wherein the processing circuitry is configured to:

classify the samples of the determined reference block based on each of a plurality of candidate partitioning boundaries;

determine a plurality of candidate partitioning boundaries for the current block, each of the plurality of candidate partitioning boundaries for the current block corresponding to a respective one of the plurality of candidate partitioning boundaries for the determined reference block;

determine a TM cost between each of the plurality of candidate partitioning boundaries for the samples of the determined reference block and a corresponding one of the plurality of candidate partitioning boundaries for samples of the current block;

determine a partitioning boundary from the plurality of candidate partitioning boundaries for the current block that corresponds to a minimum TM cost among the determined TM costs; and determine the plurality of partitions of the current block based on the determined partitioning boundary.

19. The apparatus of claim 12, wherein the processing circuitry is configured to:

determine a binary mask based on one of an average value and a median value of reconstructed samples of the template of the current block;

determine a dominant sample group in the reconstructed samples of the template of the current block based on the binary mask;

determine a dominant sample group in samples of a reference template of each of the plurality of candidate reference blocks based on the binary mask;

determine a TM cost between the dominant group in the reconstructed samples of the template of the current block and the dominant group in the samples of the reference template of each of the plurality of candidate reference blocks; and determine the reference block from the plurality of candidate reference blocks that corresponds to a minimum TM cost among the determined TM costs between the dominant group in the reconstructed samples of the template of the current block and the dominant group in the samples of the reference template of each of the plurality of candidate reference blocks.

20. The apparatus of claim 12, wherein the processing circuitry is configured to:

determine the plurality of candidate reference blocks based on a plurality of motion vectors associated with the current block.

* * * * *